(No Model.)
E. C. WILLIS.
CLOTHES WASHER.
No. 357,441. Patented Feb. 8, 1887.
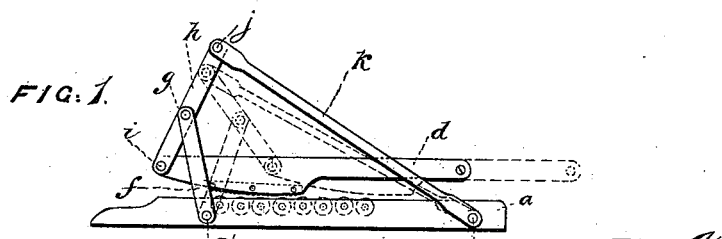
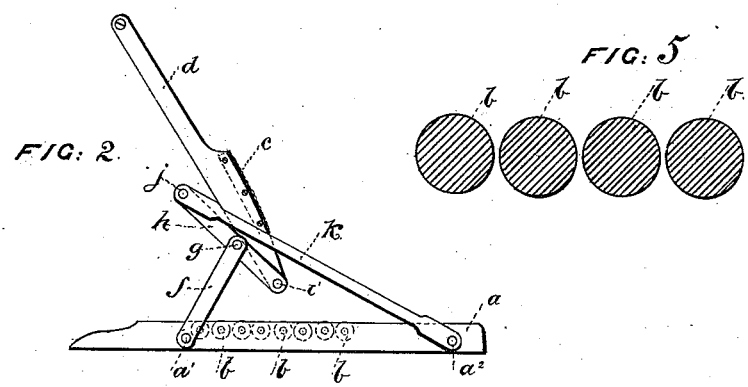
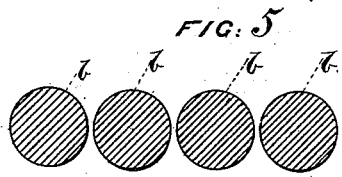
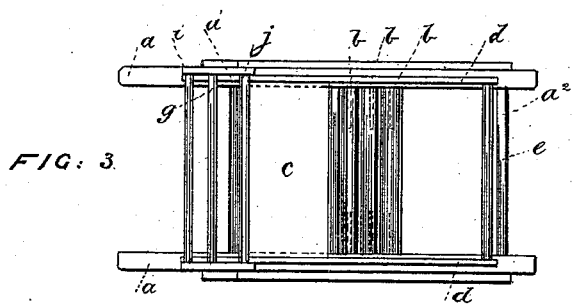
WITNESSES:
INVENTOR
Edward C. Willis
BY O'Brien & Co,
his ATTORNEYS

UNITED STATES PATENT OFFICE.

EDWARD C. WILLIS, OF DENVER, COLORADO, ASSIGNOR TO BRINTON GREGORY AND ALFRED J. O'BRIEN, OF SAME PLACE.

CLOTHES-WASHER.

SPECIFICATION forming part of Letters Patent No. 357,441, dated February 8, 1887.

Application filed August 13, 1886. Serial No. 210,845. (No model.)

*To all whom it may concern:*

Be it known that I, EDWARD C. WILLIS, a citizen of the United States, residing at Denver, in the county of Arapahoe and State of Colorado, have invented a new and useful Improvement in Clothes-Washers, of which the following is a specification, reference being had therein to the accompanying drawings, in which similar letters refer to corresponding parts.

Figure 1 is a side elevation of my improved washer, showing the same in position ready for work. Fig. 2 is a side elevation showing the device with the rubbing-board upraised. Fig. 3 is a top view of the washer. Fig. 4 is an enlarged section cut through the rubbing-board, showing a portion of the same. Fig. 5 is an enlarged section cut through the rollers.

In the drawings, $a\ a$ are two bars connected by the rods $a'\ a^2$. Between bars $a\ a$, and journaled within the same, are a number of rollers, $b$. In the ends of rollers $b$ are driven small pins, which form the journals. These journals are received within holes formed within bars $a$, said holes being sufficiently large to allow the rollers to turn easily. A short space is left between rollers $b$, so as to allow them to move freely and independently of each other.

$c$ is a rubbing-board, fluted upon one side and slightly oval, as shown. Board $c$ is attached to and fastened between arms $d$. Arms $d$ are fashioned as shown in the drawings. Between arms $d$, at one extremity, is placed the handle $e$, which is attached to the arms by means of screws.

$f\ f$ are small bars attached at one extremity to rod $a'$ on the outside of bars $a$, said rod extending through bars $a$ sufficiently for the purpose. Bars $f$ turn easily upon rod $a'$. At the other extremity bars $f$ are attached to a rod, $g$, upon which they turn freely. Rod $g$ also connects levers $h\ h$, passing through said levers at any suitable point between their extremities, said point being shown in the drawings about midway between the extremities of the levers.

Levers $h$ consist of two small bars, the lower extremities being connected by the rod $i$ and the upper extremities by the rod $j$. Levers $h$ turn easily upon the rods $g$, $i$, and $j$. Rod $i$ also passes through the forward extremities of the arms $d$, which turn freely upon said rod. Rod $j$ also passes through the forward extremities of two bars, $k$. The other extremities of bars $k$ are attached to rod $a^2$. Bars $k$ move freely upon the rod $a^2$ and $j$.

In the use of my improved washer the same is placed in an ordinary tub or any suitable receptacle containing the water required, being so placed that bars $a$ shall have the suitable inclination. The rubbing-board $c$, with its arms $d$, is then thrown upward and backward, occupying the position shown in Fig. 2. The garment to be washed is then placed upon rollers $b$ and the rubbing-board $c$ returned to the position shown in Fig. 1. The rubbing-board is then moved back and forth over the garment by the use of handle $e$.

The relative position of the parts when board $c$ is drawn backward is shown by dotted lines in Fig. 1.

During its movement board $c$ is held parallel or nearly parallel with rollers $b$ by virtue of the mechanism shown and described.

Having thus described my invention, what I claim, and desire to secure by Letters Patent, is—

In a clothes-washer, the combination of fluted board $c$, arms $d$, provided with a suitable handle, $e$, levers $f$ and $k$, links $h$, rods $i$, $j$, and $g$, bars $a$, connected by rods $a'$ and $a^2$, and rollers $b$, journaled in bars $a$, substantially as described.

EDWARD C. WILLIS.

In presence of—
G. M. ALLEN,
J. B. WILLSEA.